(12) United States Patent
Juarez et al.

(10) Patent No.: US 8,774,635 B2
(45) Date of Patent: Jul. 8, 2014

(54) FIBER-OPTIC AUTOMATIC GAIN CONTROL SYSTEMS AND METHODS

(75) Inventors: Juan C. Juarez, Windsor Mill, MD (US); David W. Young, Clarksville, MD (US); Joseph E. Sluz, Ellicott City, MD (US)

(73) Assignee: The Johns Hopkins University, Baltimore, MD (US)

( * ) Notice: Subject to any disclaimer, the term of this patent is extended or adjusted under 35 U.S.C. 154(b) by 510 days.

(21) Appl. No.: 13/173,155

(22) Filed: Jun. 30, 2011

(65) Prior Publication Data

US 2013/0004181 A1    Jan. 3, 2013

(51) Int. Cl.
*H04B 10/00* (2013.01)
*H04B 10/112* (2013.01)

(52) U.S. Cl.
CPC ................................. *H04B 10/1121* (2013.01)
USPC ......................................................... 398/118

(58) Field of Classification Search
CPC .................................................... H04B 10/2931
USPC ......................................................... 398/160
See application file for complete search history.

(56) References Cited

U.S. PATENT DOCUMENTS

| | | | |
|---|---|---|---|
| 5,311,345 A | 5/1994 | Cloonan et al. | |
| 6,411,429 B1 * | 6/2002 | Tomofuji et al. | 359/337 |
| 6,609,841 B1 | 8/2003 | Wilde et al. | |
| 6,643,469 B1 | 11/2003 | Gfeller et al. | |
| 6,804,465 B2 | 10/2004 | Volpi et al. | |
| 6,831,779 B2 * | 12/2004 | Caplan | 359/347 |
| 6,868,237 B2 | 3/2005 | Willebrand et al. | |
| 6,943,935 B2 | 9/2005 | Bickham et al. | |
| 6,958,856 B2 | 10/2005 | Inoue et al. | |
| 7,081,986 B2 | 7/2006 | DeGrange, Jr. et al. | |
| 7,092,636 B2 | 8/2006 | Doucet et al. | |
| 7,106,972 B2 | 9/2006 | Alfano et al. | |
| 7,136,585 B2 | 11/2006 | Bloom | |
| 7,164,527 B2 | 1/2007 | Denkin et al. | |
| 7,224,908 B2 | 5/2007 | Alwan et al. | |

(Continued)

FOREIGN PATENT DOCUMENTS

WO    2007113792    10/2007

OTHER PUBLICATIONS

Miyazaki, Karasawa, and Yoshida, Characteristics in neodymium-Doped Fiber Amplifiers at 1.06 um,IEICE Trans. Electron.k, vol. E79-C, No. 6, Jun. 1996.

(Continued)

*Primary Examiner* — Danny Leung
(74) *Attorney, Agent, or Firm* — Noah J. Hayward

(57) ABSTRACT

Methods and systems to control a gain applied to a free-space optical (FSO) signal to reduce time-varying intensity fluctuations. An optical pre-amplifier may provide a first, relatively moderate gain with low noise factor (NF). A second optical amplifier may provide a second gain. Amplification may include doped fiber amplification (DFA), such as erbium-doped fiber amplification (EDFA) and/or Raman amplification. A variable optical attenuator (VOA) may be controllable with a relatively fast response time to reduce the time-varying intensity fluctuations. The VOA may effectively control an overall system gain. The gain of the first and/or second optical amplifier may also be controllable to reduce the time-varying intensity fluctuations. Optical intensities may be detected at one or more locations to support one or more feed-forward and/or feedback control loops. A clamp may be applied when an optical power reaches a threshold.

18 Claims, 8 Drawing Sheets

(56) References Cited

U.S. PATENT DOCUMENTS

| | | |
|---|---|---|
| 7,233,606 B2 | 6/2007 | Varshneya et al. |
| 7,277,221 B2 * | 10/2007 | Zhou et al. ............... 359/334 |
| 7,286,766 B2 | 10/2007 | Shelton et al. |
| 7,359,639 B2 | 4/2008 | Wolcott et al. |
| 7,551,815 B2 | 6/2009 | Welch et al. |
| 2003/0090765 A1 | 5/2003 | Neff et al. |
| 2006/0024060 A1 | 2/2006 | Roth et al. |
| 2007/0053696 A1 | 3/2007 | Bloom |

OTHER PUBLICATIONS

Harun, Tamchek, Poopalan and Ahmad, High gain L-band erbium-doped fiber amplifier with two-stage double-pass configuration, Indian Academy of Sciences, PRAMANA—journal of physics, vol. 61, No. 1, Jul. 2003, pp. 93-97.

* cited by examiner

FIBER-OPTIC AUTOMATIC GAIN CONTROL SYSTEMS AND METHODS

STATEMENT OF GOVERNMENTAL INTEREST

This invention was made with U.S. Government support under contract number FA8650-04-D-2413-D0006. The U.S. Government has certain rights in the invention.

BACKGROUND

1. Technical Field

Disclosed herein are methods and systems to receive and process optical signals, including free-space optical (FSO) signals, including methods and systems to control a gain applied to an optical signal in response to time-varying intensity fluctuations, to translate the optical signal to a substantially constant-intensity optical signal.

2. Related Art

Free Space Optics (FSO) systems are used for line-of-sight communications, and may be used over distances of several kilometers (km).

There is a move towards designing free space optical communications systems to couple received light into a single-mode fiber. This may permit relatively large optical bandwidths to be accessed using elements developed and utilized in terrestrial and sub-sea optical fiber networks, such as high density optical multiplexers and demultiplexers, optical attenuators, optical filters, and optical amplifiers.

Free space optical (FSO) links are inherently different than fiber optic links, in that a FSO communication link may suffer from attenuation effects, line-of-sight limitations, and/or optical turbulence along a beam path. In addition to inducing beam spread above a diffraction limit, turbulence may introduce disruptive intensity fluctuations at a receive terminal, where large power swings may occur in millisecond scales. Power collected at a single mode FSO terminal output may vary dynamically with, for example, greater than 40 dB swings in the received signal due to scintillation.

Attenuation changes may lead to excessive errors with intensity-modulated direct detection data communications, both when amplitude variations occur over a time scale comparable to the bandwidth of the decision circuits designed to determine the presence of a mark or a space, when variations couple through the decision electronics affecting the decision threshold, or when the undesirable amplitude modulation exceeds an amplitude range of decision circuits.

Attenuation changes may be exacerbated by conventional fixed gain optical pre-amplifiers, such as erbium-doped fiber amplifiers (EDFAs), because they may output power levels well above a damage threshold of a detector in response to rapid power transients in a "Q-switch" effect.

High power levels may exist, for example, where a distance between FSO communication systems are relatively close to one another, such as within approximately 10 kilometers (km), and may arise over longer distances during benign turbulence, such as up to 100 km distances.

There is also a possibility of damage to sensitive optical detectors in cases where the upper limit of the power variations exceeds the damage threshold of the optical detector. For example, commercially available high-sensitivity receivers, such as avalanche photodiodes, have relatively limited dynamic ranges and suffer from saturation and damage from large power variations.

Conventional FSO systems utilize front-end, time-dependent loss mechanisms, such as an attenuator, prior to a receive-side optical amplifier to stabilize energy received from a fiber-coupled free-space optical terminal. Attenuation devices, by design, decrease the optical signal level to the receiver, even at minimum attenuation, and may thus reduce the optical signal-to-noise ratio (OSNR), of the received signal from which data is extracted, and may reduce the power of a received signal at a receiver input below an optimal level.

Optical amplifiers include, among others, doped fiber amplifiers (DFAs) and Raman amplifiers.

DFAs use a doped optical fiber as a gain medium to amplify an input optical signal. The input optical signal and a pump laser are multiplexed into the doped fiber, where the input signal is amplified through interaction with the dopant ions. The pump laser excites dopant ions into a higher energy from where they decay via stimulated emission of a photon at a wavelength of the input signal wavelength, and return to their lower energy level.

In an erbium doped fiber amplifier (EDFA), a fiber core is doped with trivalent Erbium ions, and may be pumped with a laser at a wavelength of 980 nm or 1,480 nm, and may exhibit gain in the 1,550 nm region.

In addition to decaying via stimulated emission, electrons in the upper energy level may also decay by spontaneous emission, in which photons are emitted spontaneously, or randomly, in all directions. A portion of the spontaneously emitted photons may be amplified by other dopant ions via stimulated emission, and are thus referred to as amplified spontaneous emission (ASE). Forward-propagating ASE may co-propagate with the amplified input signal and may thus degrade amplifier performance. Backward or counter-propagating ASE may reduce a gain of the amplifier.

Raman amplifiers are based on stimulated Raman scattering (SRS) phenomenon, in which a photon of a lower frequency input optical signal induces inelastic scattering of a photon of a higher-frequency pump laser, within a non-linear gain medium lattice, such as an optical fiber. The inelastic scattering produces a photon coherent with the input optical signal, and resonantly passes surplus energy to vibrational states of the gain medium.

Raman amplifiers include distributed and lumped Raman amplifiers. In a distributed Raman amplifier, a transmission fiber is used as the gain medium. The transmission fiber may be a highly nonlinear fiber with a relatively small core to increase interactions between the input optical signal and the pump laswer and thereby reduce the length of fiber needed. In a lumped Raman amplifier, a dedicated, shorter length of fiber is used as the gain medium.

A Raman amplifier pump laser light may be coupled into the transmission fiber in the same direction as the signal (forward-pumped), in the opposite direction (reverse-pumped), or both.

A Raman amplifier pump laser may use more power than that of an EDFA for a given gain, but may provide more distributed amplification within a transmission fiber, which may increase the distance the amplified light can travel, and may provide amplification over a wider range of regions.

SUMMARY

Disclosed herein are methods and systems to receive and process optical signals, including free-space optical (FSO) signals.

Also disclosed herein are methods and systems to control a gain applied to an optical signal in response to time-varying intensity fluctuations, to translate the optical signal to a substantially constant-intensity optical signal.

Also disclosed herein are methods and systems to implement an optical gain control system with a relatively low noise figure (NF) and a relatively high-dynamic range, in a single-mode fiber architecture.

An optical gain control system may include a first optical amplifier, also referred to herein as an optical pre-amplifier, to provide a first gain level, which may include moderate gain with a low noise figure (NF).

The optical gain control system may further include a second optical amplifier to provide a second gain level.

The first and second optical amplifiers may each include a corresponding doped fiber amplifier (DFA), such as an erbium-doped fiber amplifier (EDFA). Alternatively, one or more of the first and second optical amplifiers may include a Raman amplifier.

The first and second optical amplifiers may define an upper gain level of the optical gain control system.

The optical gain control system may further include a variable optical attenuator (VOA), which may be controllable based on the time-varying intensity fluctuations, and with a response time that is faster than the time-varying intensity fluctuations. The VOA may be implemented to receive an amplified optical signal from the optical pre-amplifier.

The VOA may effectively control a system gain. The system gain may be at a maximum, which may be defined as the upper gain level, when the attenuation is at a minimum. Conversely, the system gain may be at a minimum when the attenuation is at a maximum.

The VOA may be controlled to apply a first attenuation level when an optical intensity or power of an optical signal is at target level. The target level may represent a maximum power level of the optical signal, and the first attenuation level may correspond to a system gain of less than the upper gain level.

When the optical power falls below the target level, the VOA may be controlled to reduce the attenuation level, and thus increase the system gain towards the upper gain level, to maintain the optical power at the target level.

Also disclosed herein are methods and systems to clamp the optical signal, or a gain applied to the optical signal, when the optical power reaches a threshold.

Also disclosed herein are methods and systems to controllably power-up optical amplification components, which may protect one or more optical components from power-related damage.

Also disclosed herein are hybrid optical components, which may be implemented to reduce costs and/or losses.

Methods and systems disclosed herein are not limited to features summarized herein.

BRIEF DESCRIPTION OF THE DRAWINGS/FIGURES

Figure 1:
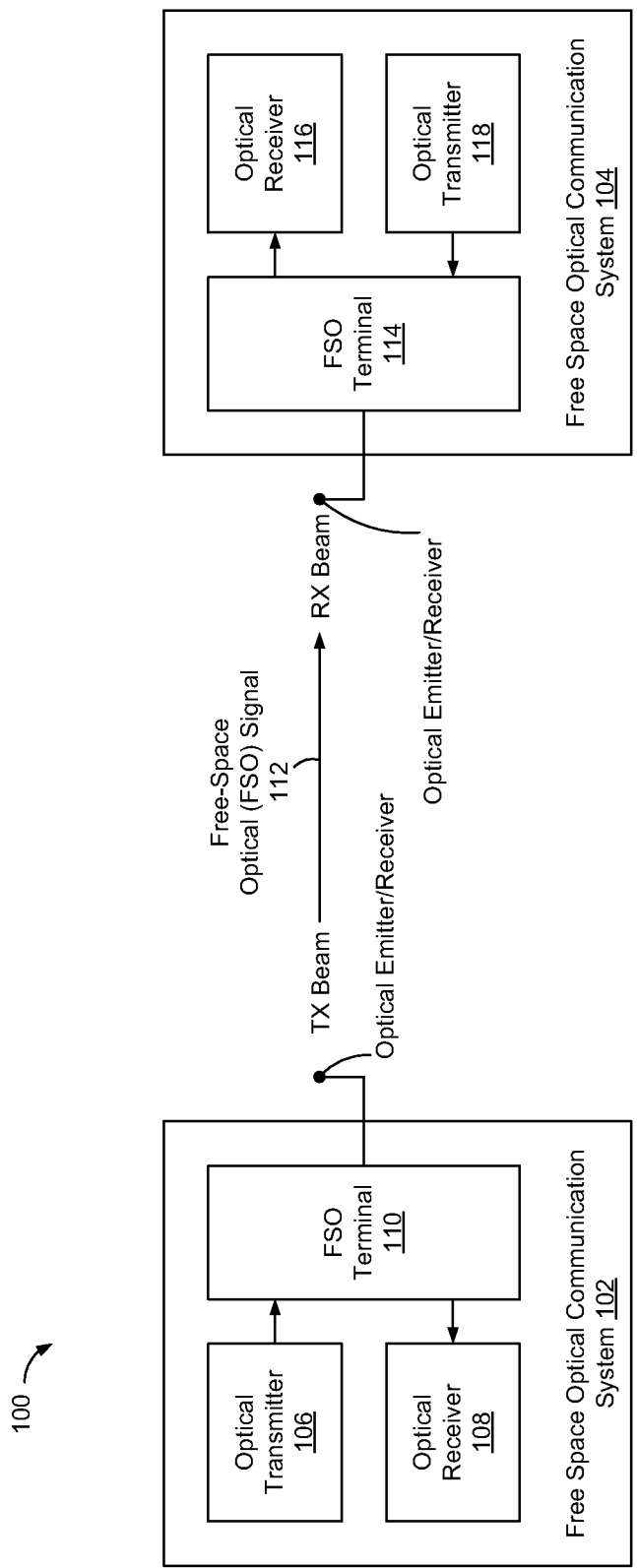
FIG. 1 is a block diagram of a free space optical (FSO) communication environment, including first and second FSO communication systems.

In the drawings, the leftmost digit(s) of a reference number identifies the drawing in which the reference number first appears.

DETAILED DESCRIPTION

FIG. 1 is a block diagram of a free space optical (FSO) communication environment 100, including FSO communication systems 102 and 104.

FSO communication system 102 includes an optical transmitter 106 to output an optical signal, and an FSO terminal 110 having transmission optics to transmit the optical signal through free space as an optical signal 112. FSO terminal 110 may further include a pointing and tracking system.

The term "free space," as used herein, refers to a non-fiber or non-cable medium, and may include, without limitation, terrestrial atmospheric space (i.e., air), extraterrestrial or outer-space, and/or a vacuum.

The term "optical signal," as used herein, refers to propagating light, such as laser light or a laser beam. An optical signal may encompass a range of wavelengths, referred to herein as a wavelength bandwidth.

Optical signal 112 may have a center wavelength of, for example, approximately 1550 nanometers (nm), and may have an optical intensity or power within a range of, for example, approximately 100 milliwatts (mW) and 3 Watts (W), and may be within a range of approximately 2 W to 3 W. Methods and systems disclosed herein are not, however, limited to these examples.

Optical transmitter 106 may be implemented to modulate optical signal with information, and may be implemented to perform on-off keying (OOK) or phase shift keying (PSK) modulation with symbols in a sub-nano-second time frame.

FSO communication system 102 may further include an optical receiver 108, and FSO terminal 110 may further include combination optics to receive an optical signal as well as transmit. FSO communication system 102 may be referred to herein as a bi-directional communication system.

FSO communication system 104 may include an FSO terminal 114 and an optical receiver 116 to receive optical signal 112. FSO terminal 114 may include receive optics, and may include a pointing and tracking system.

FSO communication system 104 may further include an optical transmitter 118, and FSO terminal 114 may further include combination optics to transmit an optical signal as well as receive. FSO communication system 104 may be referred to herein as a bi-directional communication system.

In FIG. 1, optical signal 112 is also illustrated as a TX beam upon transmission by FSO communication system 102, and as a RX beam upon arrival at FSO communication system 104.

RX beam 112 may exhibit relatively large intensity or power variations, also referred to herein as fade, over relatively short time spans, such as on millisecond time-frames. A power level of RX beam 112 may vary, for example, from a sub-microwatt level to a milliwatt level. In other words, a dynamic range of RX beam 112 may be on the order of 4 or 5 orders of magnitude.

Optical receiver 116 may be implemented to compensate for relatively large and frequent power variations in RX beam 112, to provide a conditioned optical signal that exhibits essentially flat or minimal power variations.

Figure 2:
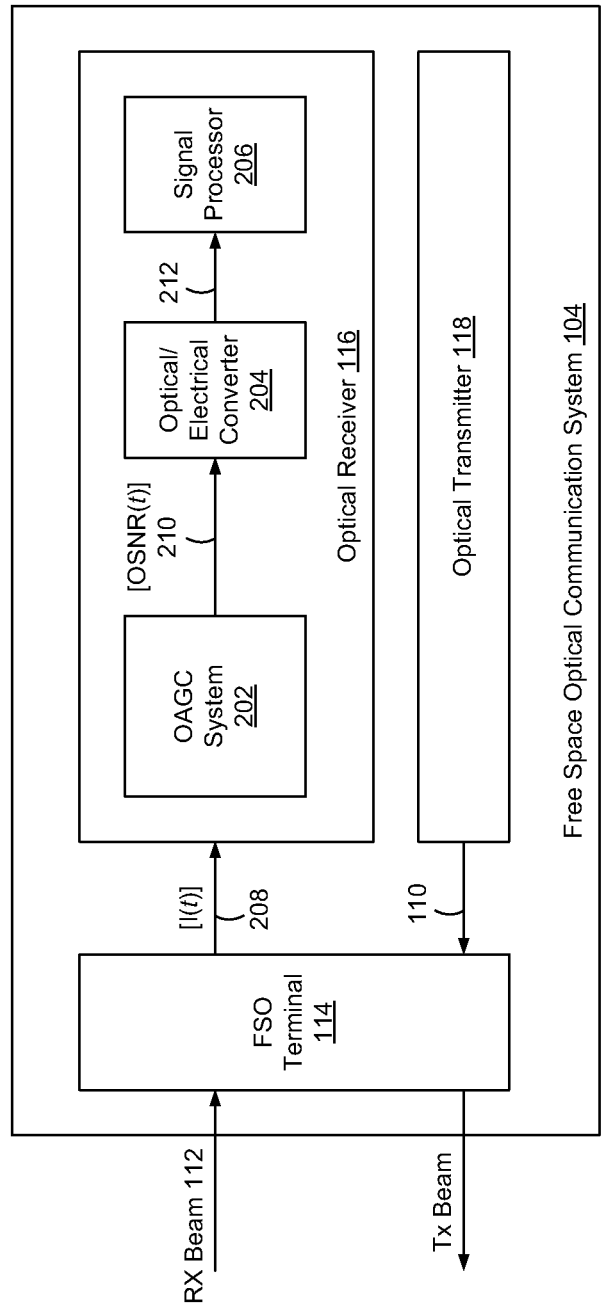
FIG. 2 is a block diagram of the second FSO communication system of FIG. 1, including an optical automatic gain control (OAGC) system.

FIG. 2 is a block diagram of FSO communication system 104, where optical receiver 116 includes an optical automatic gain control (OAGC) system 202, an optical-to-electrical converter 204, and a signal processor 206.

FSO terminal 114 may be implemented to provide RX beam 112 to optical receiver 116 as a time-variant optical signal [I(t)] 208.

OAGC system 202 may be implemented to optically amplify optical signal 208 with a relatively low noise factor (NF), and dynamically adjust an attenuation applied to optical signal 208 to control an overall system gain in response to intensity fluctuations. OAGC system 202 may thus translate time-varying optical signal [I(t)] 208 to a substantially constant-intensity optical signal 210.

Optical signal 210 may have a varying optical signal-to-noise ratio, corresponding to modulating information imposed by transmitter 106 in FIG. 1, and may be referred to herein as optical signal OSNR(t) 210.

OAGC system 202 may be implemented to compensate for relatively high frequency intensity fluctuations in optical signal 208.

Optical-to-electrical converter 204 may be implemented to convert optical signal 210 to an electrical signal 212, and signal processor 206 may be implemented to process optical signal 120, such as to decode and/or demodulate information from electrical signal 212. Optical-to-electrical converter 204 may include a photo-diode.

Figure 3:
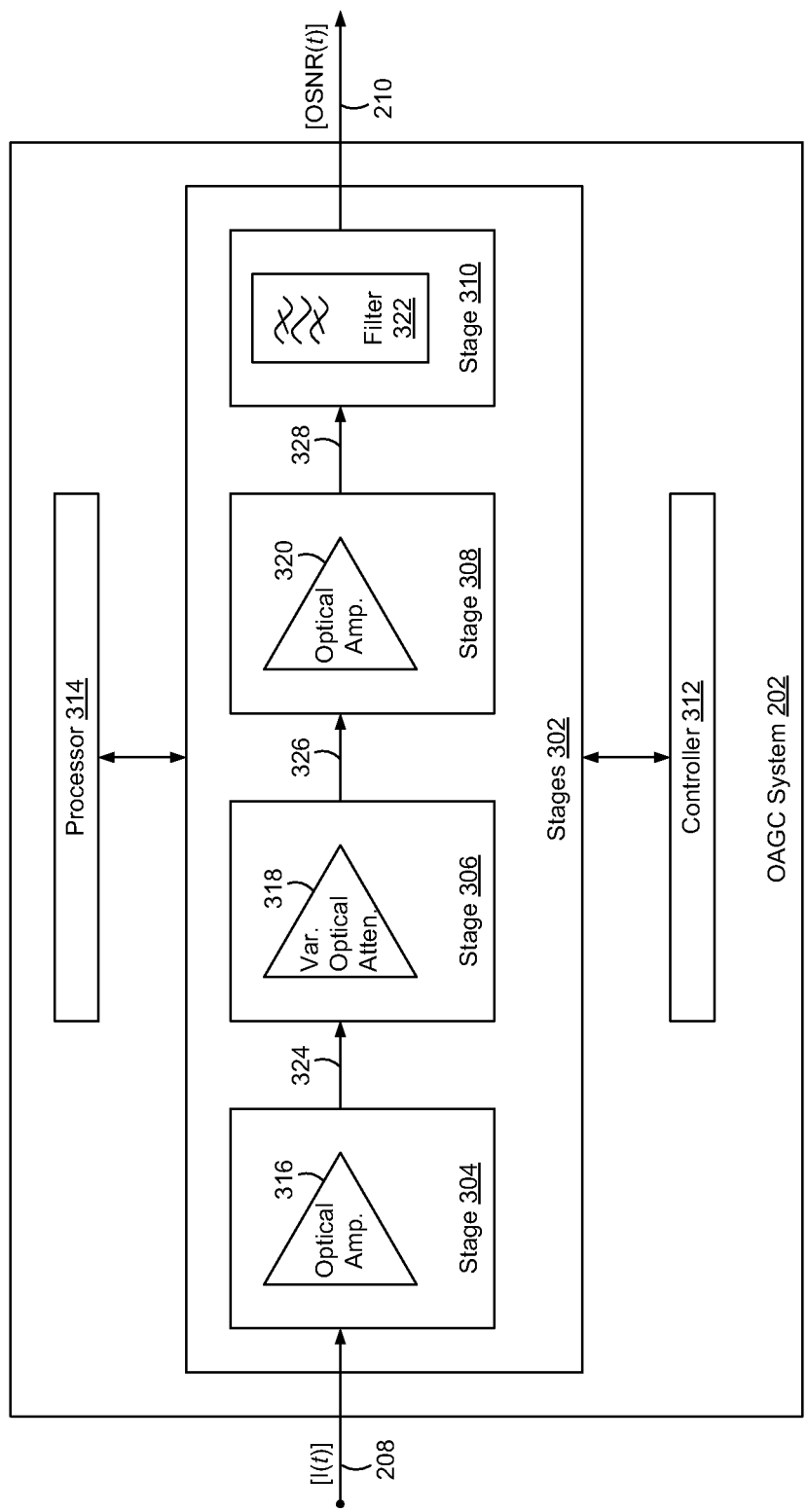
FIG. 3 is a block diagram of an example implementation of the OAGC system, including a first optical amplifier stage, a variable optical attenuator (VOA) stage, a second optical amplifier stage, an optical filter stage, and a controller.

FIG. 3 is a block diagram of an example implementation of OAGC system 202, including a plurality of stages 302, illustrated here as including stages 304 through 310. Stage 304 may include a first optical amplifier 316, stage 306 may include a variable optical attenuator 318, stage 308 may include a second optical amplifier 320, and stage 310 may include an optical filter 322.

The term "stage" is used herein for illustrative purposes to refer to a group of one or more features and/or components. A stage may represent a conceptual and/or a literal grouping of features and/or components. Methods and systems disclosed herein are not, however, limited to stage-based implementations.

OAGC system 202 may include at least one optical detector to detect optical intensities or power at one or more locations within OAGC system 202. An intensity may be detected with respect to optical signal 208 input to OAGC system 202 and/or an optical signal within OAGC system 202, which may be referred to herein as power-in-fiber (PIF) detection. An intensity may be detected with respect to an optical signal output from OAGC system 202, which may be referred to herein as power-out-of-fiber (POF) detection.

OAGC system 202 may include a relatively high-speed controller 312 to control one or features of OAGC system 202 based on detected optical intensities. Controller 312 may be implemented to provide one or more of feed-forward control and feedback control.

As used herein, the term "feed-forward control" refers to control based on an optical intensity detected upstream of a controlled feature, and the term "feedback control" refers to control based on an optical intensity detected downstream of a controlled feature.

Controller 312 may include a micro-processor or field-programmable gate array (FPGA).

In the example of FIG. 3, controller 312 is illustrated as a single controller for illustrative purposes. Features and/or functions described herein with reference to controller 312 may be distributed amongst multiple components of OAGC system 202.

OAGC system 202 may include an instruction processor 314 to monitor, control, and/or report one or more features of OAGC system 202, and/or to provide information to, or exchange information with controller 312. Processor 314 may include a micro-controller, memory, and firmware-embedded instructions to be copied into the memory upon boot-up for run-time execution by the micro-controller.

One or more features described herein with respect to one of controller 312 and processor 314, may be implemented with respect to controller 312 and/or processor 314.

OAGC system 202 may protect optical-to-electrical converter 114 and processor 116 from saturation or catastrophic damage that might otherwise occur due to high optical power levels in input signal 208.

OACG system 202 may help to reduce bit errors that might otherwise arise from power fluctuations in optical signal 208, and which might otherwise introduce timing jitter in a digital "eye." In other words, by maintaining a relatively constant output power level, power transients may be substantially prevented from coupling through receiver follow-on electronics and degrading bit error rate performance in processor 206 (FIG. 2).

OAGC system 202 may be implemented to provide relatively low-noise optical amplification, which may improve receiver sensitivity. Low-noise optical amplification may be a function of, and/or characterized by a noise figure (NF) and gain metrics. A theoretical NF limit of an optical amplifier may be approximately 3 dB. In practice, an NF between 4.0 dB and 4.5 dB may be observed in a fielded system that includes input components such as taps to measure the input signal, isolators to remove backward-going amplified spontaneous emission, and filters to discriminate between the receive and transmit wavelengths. A system NF may be defined by or based upon an initial amplifier, such as optical amplifier 316 of stage 304.

Optical amplifier 316 may be implemented to provide a first gain level, with low NF, and optical amplifier 320 may be implemented to provide a second gain level. One or more of the first and second gain levels may be fixed or variable.

The first and second gain levels may define an upper gain level, and variable optical attenuator 318 may be controllable to effectively reduce the upper gain level in response to intensity fluctuations of optical signal 208, as detected at one or more places within OAGC system 202.

Variable optical attenuator (VOA) 318 may be implemented to dynamically respond to power fluctuations with a relatively fast response time, which may be equal to or less than approximately 1 microsecond (µs).

In FIG. 3, first optical amplifier 316 may be implemented to provide a relatively moderate net gain, or first gain level, with a relatively low NF. The first gain level may be, for example, between approximately 15 dB and 25 dB. Stage 304 may be referred to herein as a pre-amplifier stage, and first optical amplifier 316 may be referred to herein as a pre-amplifier.

Second optical amplifier 320 may be implemented to provide a second gain level, which may be less than, equal to, or greater than the first gain level, and which may be, for example, between approximately 20 dB and 30 dB.

OAGC system 202 may be implemented to provide an upper gain level based upon a pre-determined target output.

For a nominal target output level of −5 dBm, and where sensitivities with forward error correction approach −48 dBm at 10 giga bits per second (Gbps), for example, OAGC system 202 may be implemented to provide an upper gain level of at least 40 dB.

The upper gain level may be enforced by clamping an output of one or more of first and second optical amplifiers 316 and 320 when a detected optical intensity reaches a threshold value. For example, first optical amplifier 316 may be clamped at a threshold of approximately −25 dBm. A clamp threshold may help to maintain a desired system output level.

One or more of optical amplifiers 316 and 320 may include a doped fiber amplifier (DFA), such as an erbium DFA (EDFA), and/or yttrium-doped fiber amplifier, and may include a variable-gain DFA. Alternatively, one or more of optical amplifiers 316 and 320 may include a Raman optical amplifier, which may include a variable-gain Raman amplifier.

Example implementations of OAGC 202 and stages 304, 306, 308, and 310 are provided below with reference to FIGS. 4 through 9.

Figure 4:
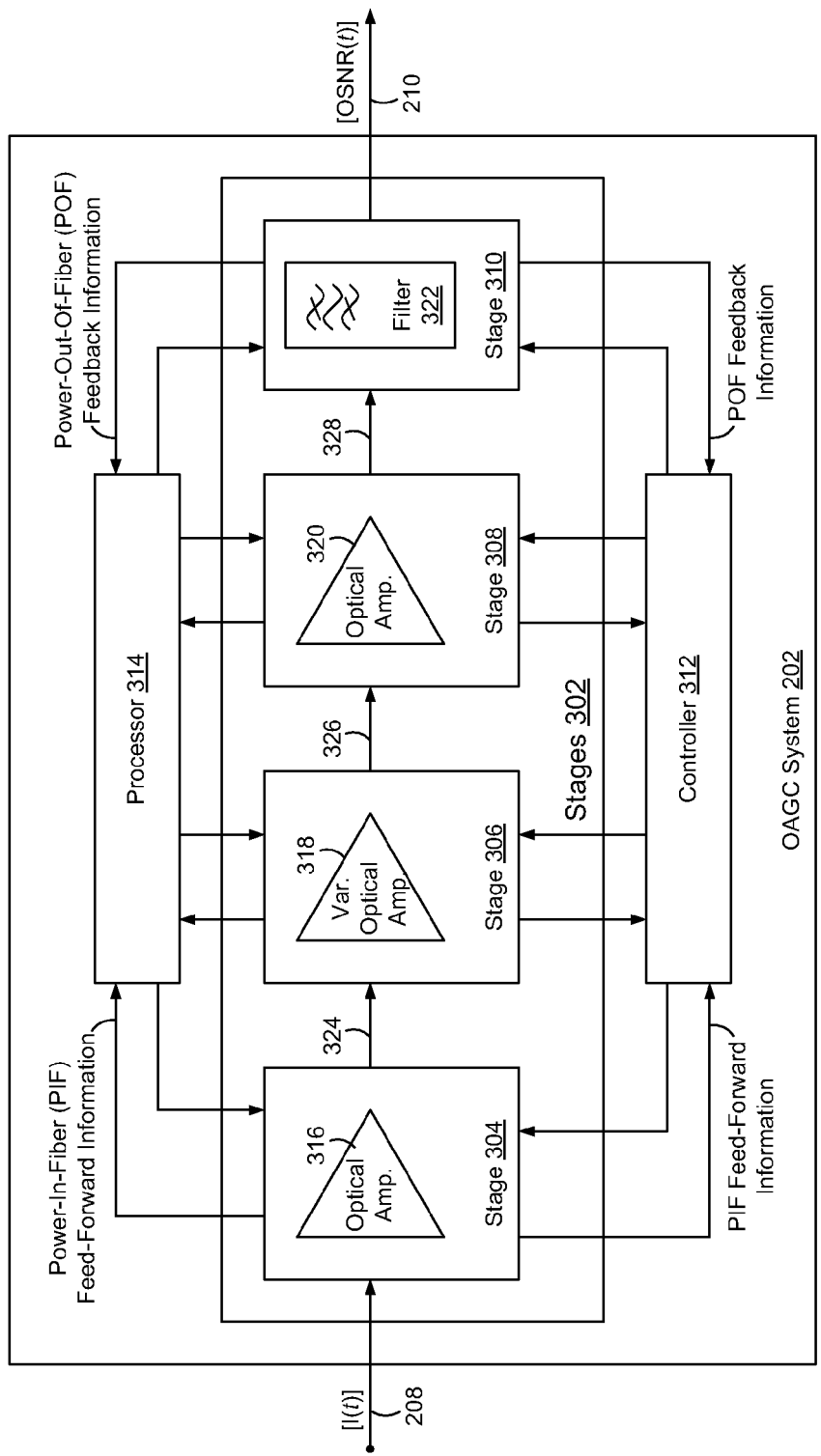
FIG. 4 is a block diagram of the OAGC system, including example feed-forward paths and feedback paths between the controller and the stages.

FIG. 4 is a block diagram of OAGC system 202, including example feed-forward paths and feedback paths between controller 312 and stages 302, and between processor 314 and stages 302. Methods and systems disclosed herein are not, however, limited to the example of FIG. 4. Example feed-forward and feedback paths are described further below with reference to one or more of FIGS. 5 through 9.

Figure 5:
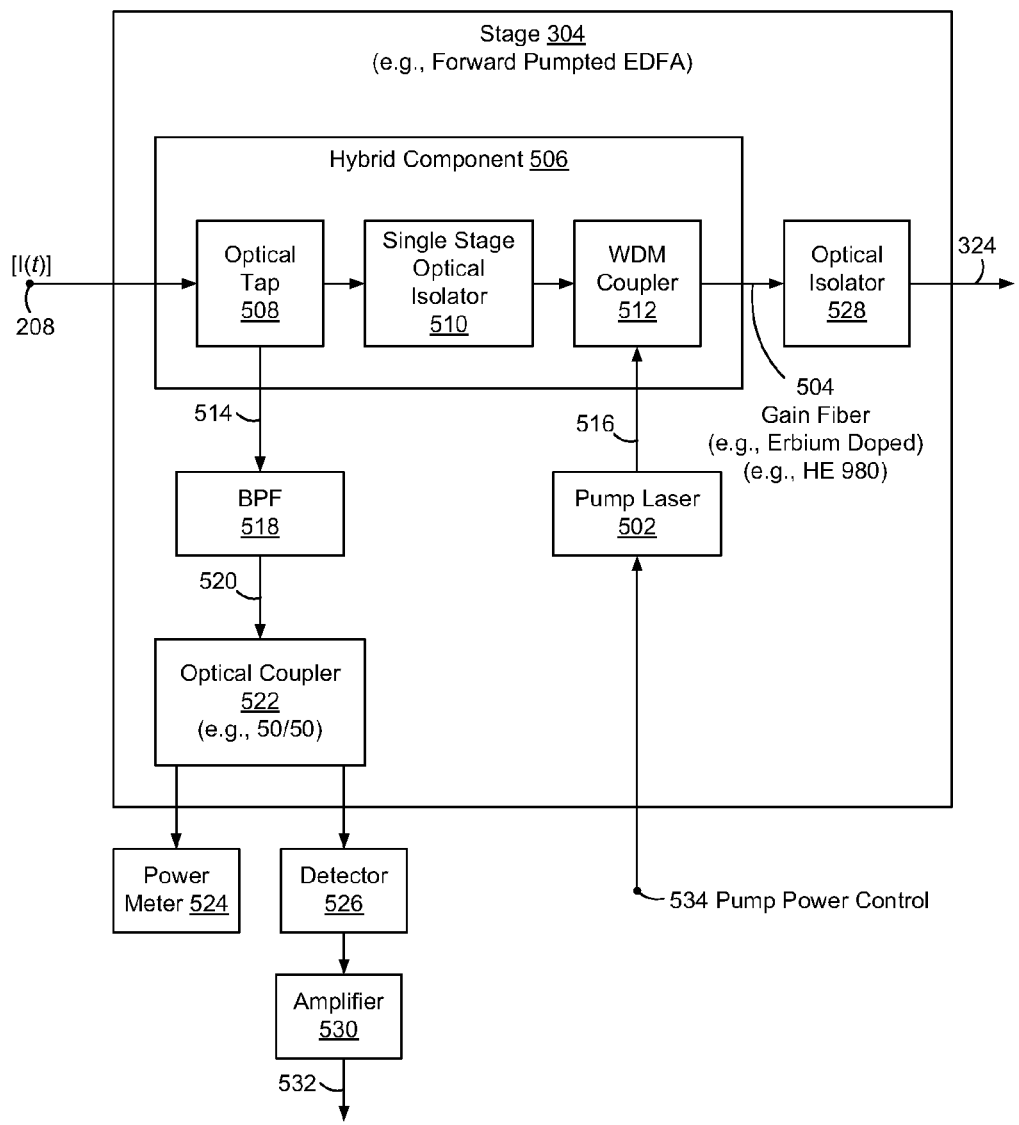
FIG. 5 is a block diagram of an example implementation of the first amplifier stage.

FIG. 5 is a block diagram of an example implementation of stage 304, including a pump laser 502, a wavelength-division-multiplexing (WDM) coupler 512, and a gain fiber 504. WDM coupler 512 may be implemented to insert a pump signal 516 from pump laser 502 into gain fiber 504, to provide optical amplification in a forward-pumped configuration. A forward-pumped configuration may provide a relatively low NF, may reduce ASE flowing backwards, and may provide flexibility in adjusting system gain with adjustments to pump power, as signal 208 is amplified on a front side of gain fiber 504 by co-propagating pump signal 516.

Pump laser 502 may receive a pump power control signal 534 from one or more of controller 312 and processor 314 to control a pump power of pump laser 502. Pump laser 502 may include, for example, a 980 nm or a 1480 nm pump laser.

Gain fiber 504 may include an erbium doped fiber, such as a commercially available fiber known as HE980. An erbium doped fiber may provide optical gain with a relatively low NF.

Gain fiber 504 may be implemented with a relatively low mode field diameter and a relatively large numerical aperture, which may support relatively large signal intensities of pump signal 510 and signal wavelengths of optical signal 208. This may provide overlap between pump signal 510 and signal 208, overlap between signal 208 and erbium ion distribution, and/or overlap with an ion inversion level.

Pump laser 502 may be implemented to pump gain fiber 504 relatively strongly so as to invert relatively highly along an entire length of gain fiber 504, for a relatively low NF.

Gain fiber 504 may be implemented to provide relatively moderate to high gain for low-power signals, with minimal added noise.

Stage 304 may be implemented to provide relatively constant (DC) gain, a relatively low noise figure, and relatively moderate gain. A transfer function of stage 304 may act as a limiting function at higher intensities or power of optical signal 208.

Stage 304 may include an first optical isolator 510, which may be implemented as a single stage optical isolator, as opposed to a two stage isolator, which may reduce loss and/or substantially prevent backward-going amplified spontaneous emission (ASE) from reaching front-end systems, such as FSO terminal 114 in FIGS. 1 and 2.

Stage 304 may include a second optical isolator 528 to prevent backward-going energy from entering a gain cavity of pump laser 502, which may otherwise induce lasing and/or introduce noise. Second optical isolator 528 may include a single or double stage optical isolator.

Stage 304 may include an optical tap 508 to provide a relatively small percentage of optical signal 208 as an optical tap signal 514. Optical tap signal 514 may be used for link characterization, logging data, and/or to determine various operational functions. Optical tap signal 514 may be utilized for feed-forward control by one or more of controller 312 and processor 314 in FIG. 3.

Optical tap 508, optical isolator 510, and WDM coupler 512, or a subset thereof, may be integrated as a package, referred to herein as a hybrid component 506, which may reduce size and/or losses.

Stage 304 may include a filter 518, illustrated here as a band pass filter (BPF), to filter out-of-band wavelengths from optical tap signal 514.

Stage 304 may include an optical coupler 522 to divide a filtered optical tap signal 520 amongst multiple devices, illustrated here a power meter 524 and a detector 526.

Detector 526 may include an optical-to-electrical detector, such as a photo-detector, to convert an optical signal from coupler 522 to an electrical signal (e.g., power versus time information), which may be provided to a linear and/or logarithmic amplifier 530 to generate an indication 532 of a detected intensity or power level of optical signal 208. Indication 532 may be provided to controller 312 and/or processor 314 (FIG. 3), such as for feed-forward control of VOA 318 (FIG. 3), and/or other components of OAGC system 202.

Power meter 524 may be used for monitoring purposes.

Stage 304 may include a wavelength-sensitive multiplexer positioned prior to WDM 512 and/or hybrid component 506, to receive optical signal 208 and a saturation laser tone from a saturation laser. A center wavelength of the saturation laser tone may be slightly offset from a center wavelength of optical signal 208, and may be, for example, within a 1550 nanometer (nm) band, and may be, for example, approximately 1554.3 nm. The saturation tone may substantially prevent amplifier Q-switching when optical signal 208 swings in power.

Stage 304 may further include a wavelength-sensitive demultiplexer positioned subsequent to WDM 512 and/or hybrid component 506, to remove the saturation laser tone, such as by optical termination. The demultiplexer may output an optical signal that is, for example, approximately 3 orders of magnitude greater than optical signal 208.

Stage 304 may output an optical signal 324.

Figure 6:
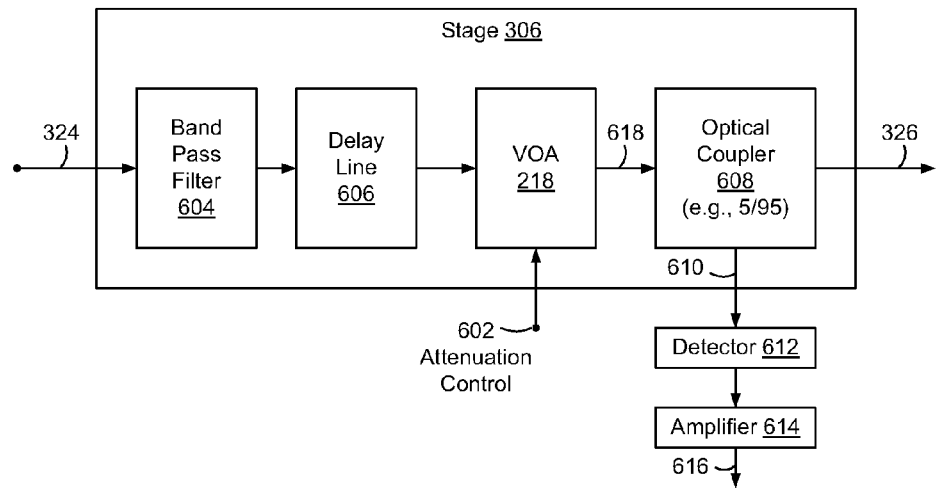
FIG. 6 is a block diagram of an example implementation of the VOA stage.

FIG. 6 is a block diagram of an example implementation of stage 306, including VOA 318 to attenuate optical signal 324.

VOA 218 may be implemented to adjust attenuation relatively rapidly in response to an attenuation control 602 from controller 312 (FIG. 3), to quickly respond to optical power transients. Controller 312 may be implemented to provide attenuation control 602 in response to optical intensity indications received through one or more feed-forward and/or feedback paths.

Stage 306 may include an optical filter 604 to remove amplified spontaneous emissions (ASEs) from signal 326, which may arise in stage 304. Filter 604 may include a band pass filter. Filter 604 may help to ensure that VOA 318 attenuates an optical wavelength or bandwidth of interest substantially without attenuating noise, which may improve effectiveness of one or more control loops associated with controller 312 and/or processor 314 (FIG. 3). The second band pass filter may have a bandwidth within a range of, for example, 0.8 nm to 3.0 nm.

Where controller 312 (FIG. 3) utilizes feed-forward information to control VOA 318, stage 306 may include a delay line 606 to time-delay optical signal 324 prior to VOA 218, to provide controller 312 with time to respond to the feed-forward information. Delay line 606 may be implemented to match a response time of a control loop, which may include time to detect an optical intensity, convert the optical intensity to an electrical signal, amplify the electrical signal, and derive attenuation control 602. Delay line 606 may include a fixed delay line.

Where stage 304, stage 308, and/or stage 310 are feed-forward controllable, the corresponding stage may include a similar delay line.

Stage 306 may include an optical coupler 608 to provide a relatively small percentage of an attenuated optical signal 618 as an optical tap signal 610 to one or more devices. Optical tap signal 610 may be used for link characterization, logging data, and/or to determine various operational functions. Optical tap signal 610 may be utilized for feed-forward control of one or more features downstream of coupler 608, and/or for feedback control of one or more features upstream of optical coupler 608.

In the example of FIG. 6, optical tap signal 610 is provided to a detector 612. Detector 612 may include an optical-to-electrical detector, such as a photo-detector, an output of which may be provided to a linear and/or logarithmic amplifier 614 to generate an indication 616 of an intensity or power level of optical signal 618. Indication 618 may be provided to controller 312 and/or processor 314 (FIG. 3), such as for feed-forward and/or feedback control of one or more features of OAGC system 202.

A remaining portion of attenuated optical signal 618 may be output from stage 306 as an attenuated optical signal 326.

Figure 7:
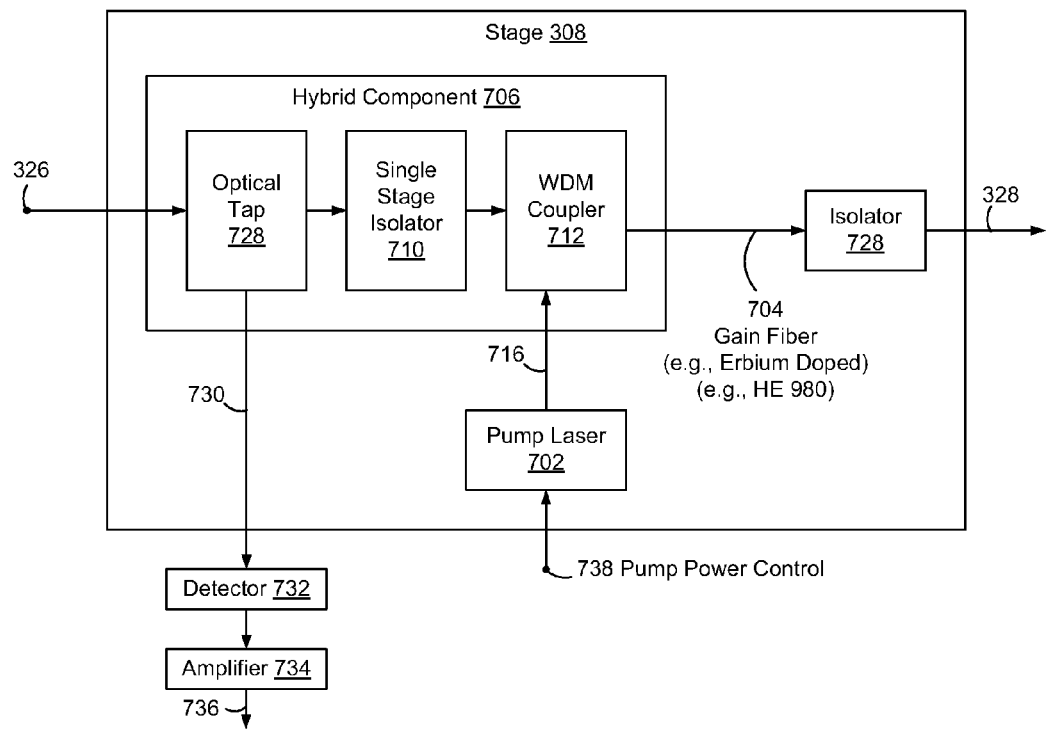
FIG. 7 is a block diagram of an example implementation of the second amplifier stage.

FIG. 7 is a block diagram of an example implementation of stage 308 to amplify attenuated optical signal 326.

In FIG. 7, stage 308 includes a pump laser 702, a gain fiber 704, and a WDM coupler 712 to couple a pump signal 716 from pump laser 702 and optical signal 326 into gain fiber 704, to provide optical amplification in a forward-pumped configuration, such as described in one or more examples herein.

Pump laser 702 may receive a pump power control signal 738 from one or more of controller 312 and processor 314 to control a pump power of pump laser 702.

Pump laser 702 may include an EDFA, and gain fiber 704 may include an erbium doped fiber, such as described in one or more examples herein.

Gain fiber 704 may be implemented with larger mode field diameter and a smaller numerical aperture relative to gain fiber 504 in stage 304 (FIG. 5), such as to support higher output power levels with a decreased pump intensity, and/or reduce or substantially prevent non-linear effects.

Stage 308 may include a first optical isolator 710, which may be implemented as a single stage optical isolator, as opposed to a two stage isolator, which may reduce loss and/or substantially prevent backward-going amplified spontaneous emission (ASE) from reaching stage 306.

Stage 308 may include an optical tap 728 to tap a relatively small percentage of optical signal 326, which may be used for feedback and/or feed-forward control. For example, an optical tap signal 730 may be provided to a detector 732, an output of which may be provided to a linear and/or logarithmic amplifier 734 to generate an indication 736 of an intensity or power level of optical signal 326. Indication 736 may be provided to controller 312 and/or processor 314 (FIG. 3), such as for feed-forward and/or feedback control of one or more features of OAGC system 202.

Optical tap 728, optical isolator 710, and WDM coupler 712, or a subset thereof, may be integrated as a package, referred to herein as a hybrid component 706, which may reduce size and/or losses.

Stage 308 may include a second optical isolator 728 to prevent backward-going signals from entering a gain cavity of pump laser 702, which may otherwise induce lasing and/or introduce noise. Optical isolator 728 may include a single or double stage optical isolator.

Stage 308 may output an optical signal 328.

Figure 8:
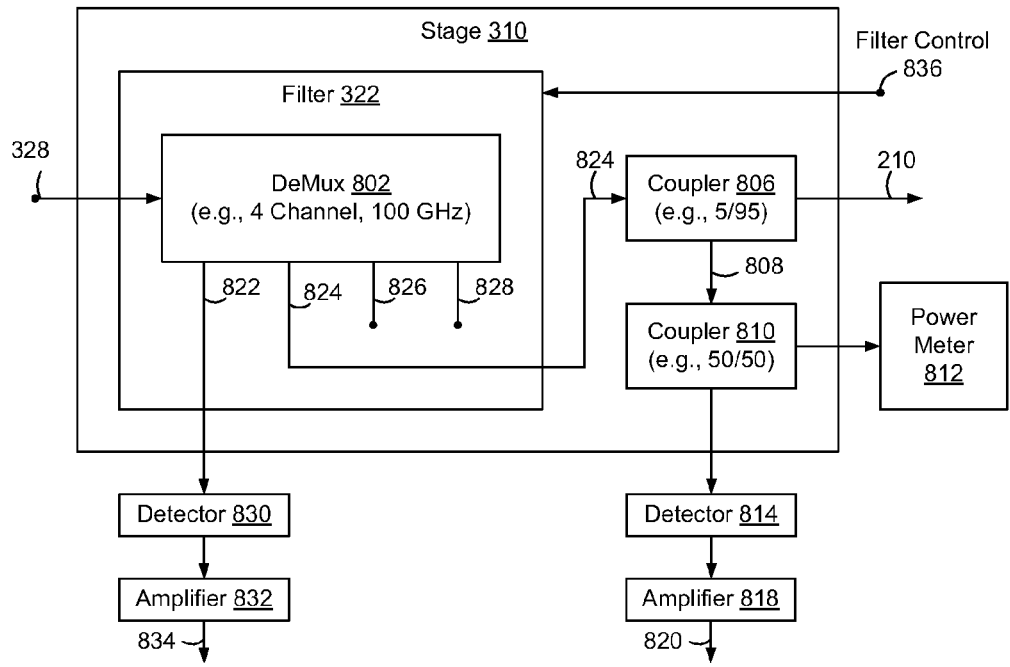
FIG. 8 is a block diagram of an example implementation of the filter stage.

FIG. 8 is a block diagram of an example implementation of stage 310, including optical filter 322 to filter optical signal 328. Stage 310 may be referred to herein as an optical demultiplexer stage, as described below.

Optical filter 322 may include an optical drop filter, centered approximately at a wavelength of interest, to filter ASE noise from optical signal 328. Optical filter 322 may have a filter bandwidth of, for example, between 50 and 100 GHz.

Optical filter 322 may include a fixed wavelength filter or a tunable filter controllable with a control 836.

In FIG. 8, optical filter 322 extracts or outputs a filtered version of optical signal 328 as an optical signal 824.

Stage 310 may include a first optical coupler 806 to provide a relatively small percentage of optical signal 824 as an optical tap signal 808 to one or more devices. First optical coupler 806 may output a remaining portion of optical signal 824 as optical signal 210, which may be provided to optical-to-electrical converter 204, as illustrated in FIG. 2.

Stage 310 may further include a second optical coupler 810 to divide optical tap signal 808 amongst multiple systems and/or devices, illustrated here a power meter 812 and a detector 814.

Detector 814 may include an optical-to-electrical detector, such as a photo-detector, an output of which may be provided to a linear and/or logarithmic amplifier 818 to generate an indication 820 of an intensity or power level of optical signal 824. Indication 820 may be provided to controller 312 and/or processor 314 (FIG. 3), such as for feedback control.

Power meter 812 may be used for monitoring purposes.

Optical filter 322 may include a multi-channel optical demultiplexer 802 to output multiple optical bands or channels of optical signal 328, illustrated here as optical signals 822, 824, 826, and 828. This may permit OAGC system 202 to support multiple wavelength channels.

One or more optical signals 822, 824, 826, and 828 may be used for monitoring, reporting, and/or feedback control. For example, one or more optical signals 822, 826, and 828 may represent a band outside of a filter bandwidth, and may be used to provide a noise level measurement.

In FIG. 8, an optical-to-electrical detector 830 and a corresponding amplifier 832 are illustrated to generate an indication 834 of a noise measure of optical signal 822. Indication 834 may be provided to controller 312 and/or processor 314 (FIG. 3), such as for feedback control. One or more additional optical-to-electrical detectors and corresponding amplifiers may be implemented for other outputs of demultiplexer 802.

Figure 9:
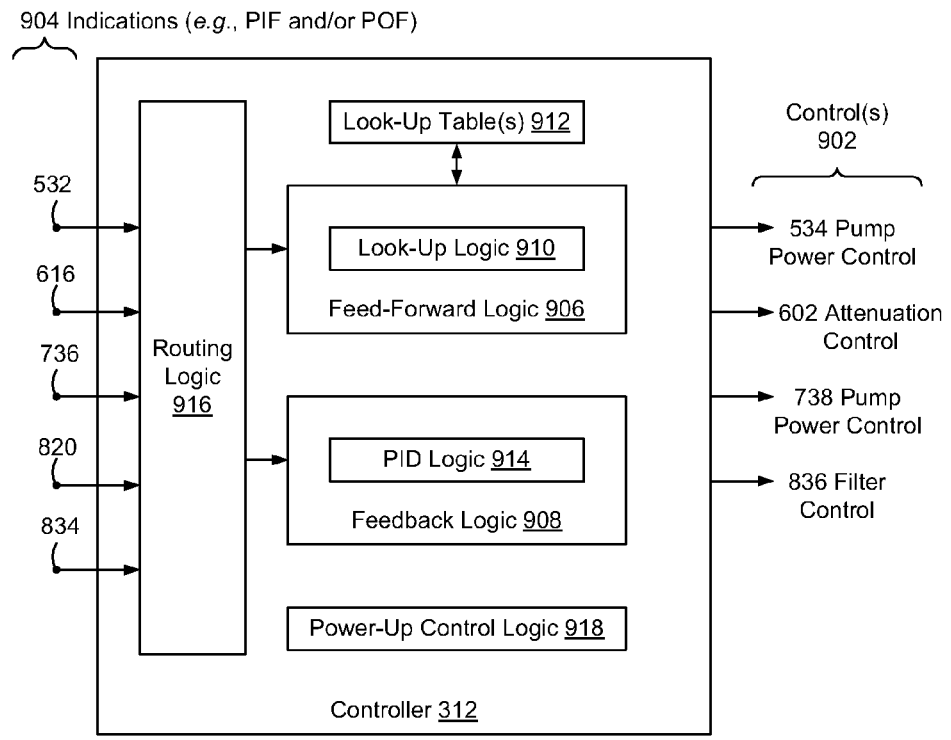
FIG. 9 is a block diagram of an example implementation of the controller.

FIG. 9 is a block diagram of an example implementation of controller 312 to control one or more of optical amplifier 316, variable optical attenuator 318, optical amplifier 320, and optical filter 322.

In the example of FIG. 9, controller 312 is implemented to output one or more controls 902, which may include one or more of pump power control 534 in FIG. 5, attenuation control 602 in FIG. 6, pump power control 738 in FIG. 7, and filter control 836 in FIG. 8.

Controller 312 may be implemented to generate or derive one or more controls 902 based on one or more indications 904. Indications 904 may include one or more of:
- indication 532 in FIG. 4;
- indication 616 in FIG. 6;
- indication 736 in FIG. 7; and
- indication 820 and/or 834 in FIG. 8.

Controls 902 and indications 904 are not, however, limited to the examples of FIG. 9.

Controller 312 may include feed-forward logic 906 and/or feedback logic 908 to generate or derive one or more controls 902. Feed-forward logic 906 may include look-up logic 910 to look-up a control value in one or more look-up tables 912. Feedback logic 908 may include proportional-integral-derivative (PID) logic 914 to determine an error value as a difference between an indication 904 and a desired value, and to adjust one or more controls 902 to minimize the difference. Controller 312 may further include routing logic 916 to direct one or more indications 904 to feed-forward logic 906 and/or feedback logic 908.

OAGC system 202 may include one or more control loops, examples of which are provided below. Methods and systems disclosed herein are not, however, limited to the example control loops.

OAGC 202 may include a VOA control loop to derive attenuation control 602 in FIG. 6. The VOA control loop may be implemented as a feed-forward control loop, a feedback control loop, or a hybrid feed-forward and feedback control loop.

A feed-forward VOA control loop may utilize indication 532 in FIG. 5.

A feedback VOA control loop may utilize one or more of indication 616 in FIG. 6, indication 736 in FIG. 7, indication 820 in FIG. 8, and indication 834 in FIG. 8.

A hybrid VOA control loop may utilize a combination of indication 532 in FIG. 5 and one or more of indication 616 in FIG. 6, indication 736 in FIG. 7, indication 820 in FIG. 8, and indication 834 in FIG. 8.

A VOA control loop may operate based on an average power, measured over a sub-millisecond time frame, and may be responsive to variations on an order of hundreds of microseconds. Such an implementation may provide suitable reaction to falling and rising edges of a fade, which may occur on the microsecond time frame. VOA control loop components, such as controller 312, VOA 318, an optical detector, a photo diode, and an electrical signal amplifier, may be selected to meet a desired response time.

OAGC 202 system may include one or more gain control loops to control a gain optical amplifier 316 and/or optical amplifier 320. A gain control loop may include a feed-forward control loop, a feedback control loop, and/or a hybrid control loop.

OAGC 202 system may include a clamp control loop to limit an intensity of an optical signal within OAGC 202 when the intensity reaches a threshold value.

A clamp control loop may be implemented to manage attenuation control 602 to clamp an upper limit of optical signal 618 (FIG. 6) at a pre-determined level, such as −15 dBm. Such a clamp control loop may utilize indication 616 as feedback control.

A clamp control loop may be implemented to clamp a gain of amplifier 316 and/or 320 when an intensity of an optical signal reaches the threshold value.

Controller 312 may include power-up control logic 918 to control one or more components of OAGC system 202 during power-up. Power-up control logic 916 may be implemented, for example, to delay power-up of stage 308 until stage 304 is powered-up. Start-up control logic 916 may be further implemented to ramp-up, or increase gain of stage 304 over time, and to subsequently ramp-up, or increase gain of stage 308 over time. Power-up control logic 16 may be further implemented to ramp-up gain of stage 304 and/or stage 308 relatively slowly, such as over a period of up to approximately 2 seconds.

One or more features disclosed herein may be implemented in hardware, software, firmware, and combinations thereof, including discrete and integrated circuit logic, application specific integrated circuit (ASIC) logic, and microcontrollers, and may be implemented as part of a domain-specific integrated circuit package, or a combination of integrated circuit packages. The term software, as used herein, refers to a computer program product including a computer readable medium having computer program logic stored therein to cause a computer system to perform one or more features and/or combinations of features disclosed herein.

Figure 10:
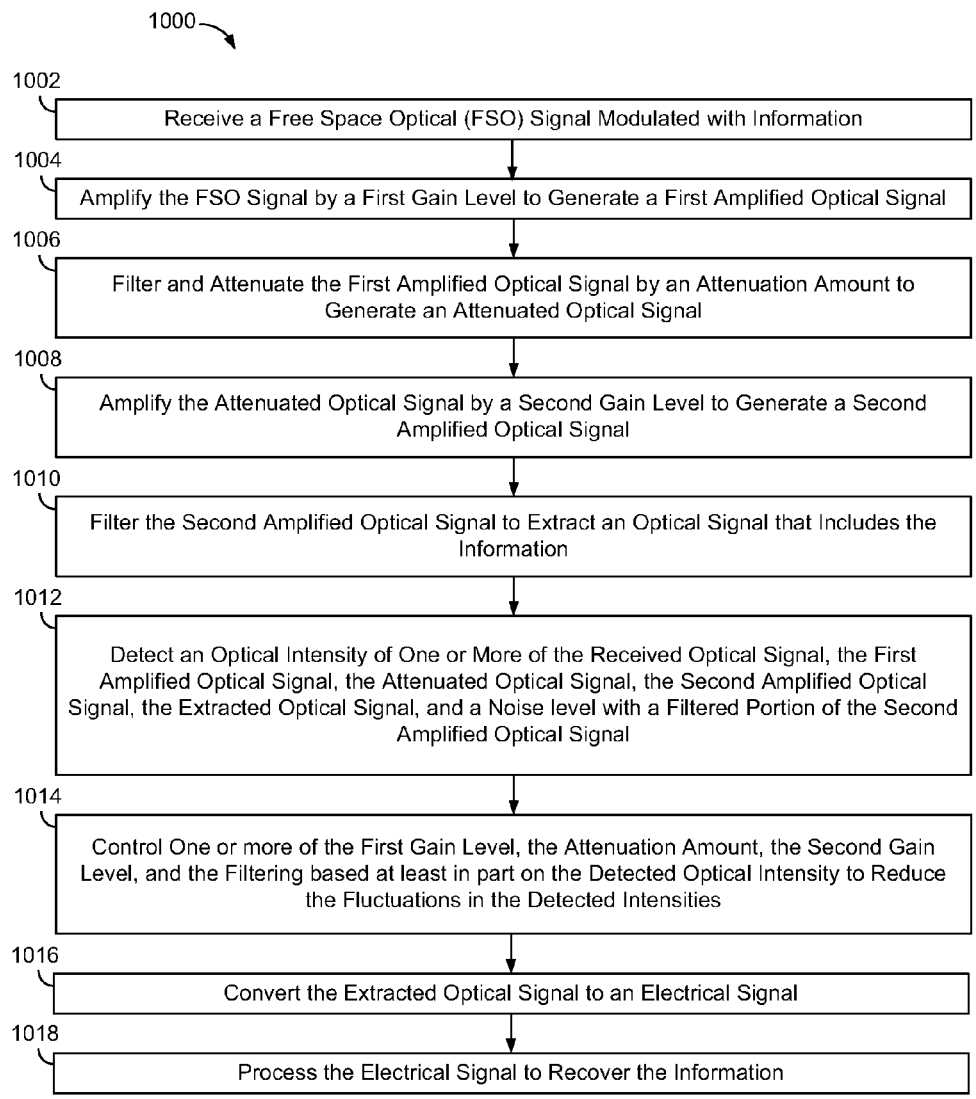
FIG. 10 is flowchart of a method of reducing power fluctuations in an optical signal.

FIG. 10 is flowchart of a method 1000 of reducing power fluctuations in an optical signal.

At 1002, a free space optical (FSO) signal is received, such as described above with reference to RX beam 112 in FIG. 1. The FSO signal may be modulated with information.

At 1004, the FSO signal is amplified by a first gain level to generate a first amplified optical signal, such as described above with reference to optical amplifier 316 in FIG. 3.

At 1006, the first amplified optical signal is filtered and then attenuated by an attenuation amount to generate an attenuated optical signal, such as described above with reference to variable optical attenuator 318 in FIG. 3.

At 1008, the attenuated optical signal is amplified by a second gain level to generate a second amplified optical signal, such as described above with reference to optical amplifier 320 in FIG. 3.

At 1010, the second amplified optical signal is filtered to extract an optical signal, or channel of interest, that includes the information, such as described above with reference to optical filter 322 in FIG. 3.

At 1012, optical intensities are detected with respect to one or more of the received optical signal, the first amplified optical signal, the attenuated optical signal, the second amplified optical signal, the extracted optical signal, and a filtered portion of the second amplified optical signal, such as described in one or more examples herein.

At 1014, one or more of the first gain level, the attenuation amount, the second gain level, and the filtering is controlled based on the detected intensities to reduce fluctuations in the detected intensities.

At 1016, the extracted optical signal is converted to an electrical signal, such as described above with reference to optical-to-electrical converter 204 in FIG. 2.

At 1018, the electrical signal is processed to recover the information, such as described above with reference to signal processor 206 in FIG. 2.

Methods and systems are disclosed herein with the aid of functional building blocks illustrating the functions, features, and relationships thereof. At least some of the boundaries of these functional building blocks have been arbitrarily defined herein for the convenience of the description. Alternate boundaries may be defined so long as the specified functions and relationships thereof are appropriately performed.

One skilled in the art will recognize that these functional building blocks can be implemented by discrete components, application specific integrated circuits, processors executing appropriate software, and combinations thereof.

While various embodiments are disclosed herein, it should be understood that they have been presented by way of example only, and not limitation. It will be apparent to persons skilled in the relevant art that various changes in form and detail may be made therein without departing from the spirit and scope of the methods and systems disclosed herein. Thus, the breadth and scope of the claims should not be limited by any of the example embodiments disclosed herein.

What is claimed is:

1. An optical gain control system to translate a received information-modulated optical signal, having time-varying optical intensity fluctuations, to a substantially constant-intensity optical signal having a time-varying optical signal-to-noise ratio that represents the modulating information, comprising:
   a first optical amplifier to amplify the received optical signal by a first gain level and output a corresponding first amplified optical signal;
   a first optical filter to filter the first amplified optical signal;
   a variable optical attenuator to controllably attenuate the filtered first amplified optical signal and output a corresponding attenuated optical signal;
   a second optical amplifier to amplify the attenuated optical signal by a second gain level and output a corresponding second amplified optical signal;
   a second optical filter to extract an optical signal from the second amplified optical signal;
   at least one detector to detect an optical intensity of one or more of the received optical signal, the first amplified optical signal, the filtered first amplified optical signal, the attenuated optical signal, the second amplified signal, the extracted optical signal, and noise within a filtered portion of the second amplified signal;
   a controller to control at least the variable optical attenuator to reduce time-varying fluctuations in the detected optical intensity such that the extracted optical signal corresponds to the substantially constant-intensity optical signal: and
   a control loop to clamp one or more of the first and second gain levels when a detected optical intensity reaches a threshold.

2. The system of claim 1, wherein the first and second optical amplifiers each include a corresponding forward-pumped, doped fiber amplifier.

3. The system of claim 1, wherein the first optical amplifier includes a forward-pumped, doped fiber amplifier, and the second optical amplifier includes a forward-pumped Raman amplifier.

4. The system of claim 1, wherein the first and second optical amplifiers are implemented as fixed-gain optical amplifiers.

5. The system of claim 1, wherein:
   at least one of the first and second optical amplifiers includes a variable gain optical amplifier; and
   the controller is implemented to control the variable gain optical amplifier based on the detected optical intensity.

6. The system of claim 1, wherein:
   the first optical amplifier is implemented to provide the first gain level within a range of approximately 15 dB to 25 dB;
   the second optical amplifier is implemented to provide the second gain level within a range of approximately 20 dB to 30 dB; and the controller and the variable optical attenuator are implemented to provide a response time of less than approximately 1 microsecond (μs).

7. The system of claim 1, wherein the controller includes a feed-forward control portion to control the variable optical attenuator based on an optical intensity detected upstream of the variable optical attenuator.

8. The system of claim 1, wherein the controller includes a feedback control portion to control the variable optical attenuator based at an optical intensity detected downstream of the variable optical attenuator.

9. The system of claim 1, wherein the controller includes one or more of:
   a feed-forward control portion to control the variable optical attenuator based on an optical intensity detected upstream of the variable optical attenuator; and
   a feedback control portion to control the variable optical attenuator based on an optical intensity detected downstream of the variable optical attenuator.

10. A free-space optical (FSO) communication system, comprising:
    a FSO terminal to receive an information-modulated optical signal having time-varying optical intensity fluctuations;
    an optical gain control system to translate the received optical signal to a substantially constant-intensity optical signal having a time-varying optical signal-to-noise ratio that represents the modulating information;
    an optical-to-electrical converter to convert the substantially constant-intensity optical signal to an electrical signal; and
    a signal processor to demodulate the information from the electrical signal;
    wherein the optical gain control system includes,
    a first optical amplifier to amplify the received optical signal by a first gain level and output a corresponding first amplified optical signal,
    a first optical filter to filter the first amplified optical signal,
    a variable optical attenuator to controllably attenuate the filtered first amplified optical signal and output a corresponding attenuated optical signal,
    a second optical amplifier to amplify the attenuated optical signal by a second gain level and output a corresponding second amplified optical signal,
    a second optical filter to extract an optical signal from the second amplified optical signal,
    at least one detector to detect an optical intensity of one or more of the received optical signal, the first amplified optical signal, the filtered first amplified optical signal, the attenuated optical signal, the second amplified signal, the extracted optical signal, and noise within a filtered portion of the second amplified signal, and
    a controller to control at least the variable optical attenuator to reduce time-varying optical intensity fluctuations in the detected optical intensity such that the extracted optical signal corresponds to the substantially constant-intensity optical signal; and a control loop to clamp one or more of the first and second gain levels when a detected optical intensity reaches a threshold.

11. The system of claim 10, wherein:
    the first optical amplifier is implemented to provide the first gain level within a range of approximately 15 dB to 25 dB;
    the second optical amplifier is implemented to provide the second gain level within a range of approximately 20 dB to 30 dB; and the variable optical attenuator is implemented to provide a response time of less than approximately 1 microsecond (µs).

12. The system of claim 10, wherein:
at least one of the first and second optical amplifiers includes a variable gain optical amplifier; and
the controller is implemented to control the variable gain optical amplifier based on the detected optical intensity.

13. The system of claim 10, wherein the controller includes one or more of:
a feed-forward control portion to control the variable optical attenuator based on an optical intensity detected upstream of the variable optical attenuator; and
a feedback control portion to control the variable optical attenuator based on an optical intensity detected downstream of the variable optical attenuator.

14. A method of translating a received information-modulated optical signal, having time-varying optical intensity fluctuations, to a substantially constant-intensity optical signal having a time-varying optical signal-to-noise ratio that represents the modulating information, comprising:
amplifying the received optical signal with a first gain level to generate a first amplified optical signal;
filtering the first amplified optical signal;
attenuating the filtered first amplified optical signal to generate an attenuated optical signal;
amplifying the attenuated optical signal with a second gain level to generate a second amplified optical signal;
filtering the second amplified optical signal to extract an optical signal;
detecting an optical intensity of one or more of the received optical signal, the first amplified optical signal, the filtered first amplified optical signal, the attenuated optical signal, the second amplified optical signal, the extracted optical signal, and noise within a filtered portion of the second amplified optical signal; and
controlling at least the attenuating to reduce time-varying fluctuations in the detected optical intensity such that the extracted optical signal corresponds to the substantially constant-intensity optical signal; and
clamping one or more of the first and second gain levels when a detected optical intensity reaches a threshold by using a control loop.

15. The method of claim 14, wherein:
the amplifying with the first gain level includes amplifying within a range of approximately 15 dB to 25 dB;
the amplifying with the second gain level includes amplifying within a range of approximately 20 dB to 30 dB; and
the controlling of the attenuating includes controlling the attenuating within a response time of less than approximately 1 microsecond (µs).

16. The method of claim 14, wherein the first and second gain levels are fixed gain levels.

17. The method of claim 14, wherein the controlling includes:
varying one or more of the first and second gain levels based on the detected optical intensity.

18. The method of claim 14, wherein the controlling includes one or more of:
feed-forward controlling the attenuating based on an optical intensity detected prior to the attenuating; and
feedback controlling the attenuation based on an optical intensity detected subsequent to the attenuating.

* * * * *